(12) United States Patent
Brewer et al.

(10) Patent No.: US 9,045,180 B2
(45) Date of Patent: Jun. 2, 2015

(54) GROUND-ENGAGING TRACK SYSTEM, LINK FOR A TRACK CHAIN, AND METHOD

(71) Applicant: Caterpillar Inc., Peoria, IL (US)

(72) Inventors: Caroline Marie Brewer, Peoria, IL (US); Martin Tagore Joseph Xavier, Tamilnadu (IN); Kevin Steiner, Tremont, IL (US); Temitope Olayemi Akinlua, Peoria, IL (US); Michael Hasselbusch, Germantown Hills, IL (US); Timothy Michael Nenne, Wenona, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 13/627,063

(22) Filed: Sep. 26, 2012

(65) Prior Publication Data

US 2014/0083782 A1 Mar. 27, 2014

(51) Int. Cl.
*B62D 55/21* (2006.01)
*B62D 55/20* (2006.01)

(52) U.S. Cl.
CPC .............. *B62D 55/21* (2013.01); *B62D 55/202* (2013.01)

(58) Field of Classification Search
CPC ........ B62D 55/18; B62D 55/20; B62D 55/21; B62D 55/202; B62D 55/205
USPC .......... 305/135, 185, 195, 196, 198, 200, 201
See application file for complete search history.

(56) References Cited

U.S. PATENT DOCUMENTS

| | | | | |
|---|---|---|---|---|
| 3,955,855 | A | | 5/1976 | Massieon et al. |
| 4,324,437 | A | * | 4/1982 | Narang .......................... 305/106 |
| 4,423,910 | A | * | 1/1984 | Narang .......................... 305/190 |
| 5,500,058 | A | * | 3/1996 | Hirakawa et al. .............. 148/649 |
| 5,704,697 | A | * | 1/1998 | Ketting et al. ................. 305/193 |
| 7,040,080 | B2 | * | 5/2006 | Okawa et al. ................... 59/35.1 |
| 7,338,138 | B2 | * | 3/2008 | Sho et al. ........................ 305/201 |
| 7,657,990 | B2 | * | 2/2010 | Wodrich et al. ............... 29/527.4 |
| 7,806,209 | B2 | * | 10/2010 | Standish et al. ............... 180/9.5 |
| 2008/0284245 | A1 | | 11/2008 | Livesay et al. |
| 2009/0058182 | A1 | | 3/2009 | Mulligan |
| 2010/0052418 | A1 | | 3/2010 | Angot |
| 2011/0198917 | A1 | | 8/2011 | Mulligan |

FOREIGN PATENT DOCUMENTS

JP 08142939 A * 6/1996

* cited by examiner

*Primary Examiner* — Kip T Kotter
(74) *Attorney, Agent, or Firm* — BakerHostetler

(57) ABSTRACT

A ground-engaging track system for a machine includes a track extending about a rotatable track engaging element, and having a track chain with a plurality of elongate links each including an upper rail surface formed of a sacrificial wear material and having a convex longitudinal profile configured to delay scallop formation therein. A link for a track chain and related methodology are also disclosed.

17 Claims, 3 Drawing Sheets

GROUND-ENGAGING TRACK SYSTEM, LINK FOR A TRACK CHAIN, AND METHOD

TECHNICAL FIELD

The present disclosure relates generally to a ground-engaging track system, and more particularly to a link for such a track system shaped to delay scallop formation therein.

BACKGROUND

A wide variety of machines utilize tracks as ground-engaging propulsion elements. It is common for such tracks to include a plurality of rotatable track engaging elements, with the track forming an endless loop moved about the rotating elements during operation. Such tracks typically include two chains of coupled together links, with bolted-on track shoes. The demands placed upon such machines and their associated track assemblies can be quite substantial, and the operating environments harsh. Machine tracks are often robust to provide a long operating life of thousands of hours despite significant mechanical stresses, strain and wear experienced during operation.

The wear phenomena experienced by machine track is typically a result of how the machine is used, the experience of the operator, and both the underfoot conditions and substrate materials in the operating environment. Field service life of machine track can vary based upon these factors from a few thousand hours to many thousands of hours. Since machine track components can be relatively costly, and servicing adds expense and machine down-time, engineers have long sought strategies for reducing and managing wear between and among the components.

One example of such a strategy is taught in U.S. Pat. No. 3,955,855 to Massieon et al. Massieon et al. disclose a track-type machine having track links with contact surfaces of high wear-resistant material engaging track rollers. The high wear-resistant material may be a composite alloy metallurgically bonded into a groove in the contact surface. While Massieon et al. appear to have developed a successful strategy, there is always room for improvement, and in particular with regard to the economics of material selection and manufacturability.

SUMMARY

In one aspect, a ground-engaging track system for a machine includes a rotatable track-engaging element, and a track extending about the rotatable track engaging element and having a first and a second track chain and a plurality of track shoes coupled with the first and second track chains. The first and second track chains each include a plurality of elongate links each having an inboard side and an outboard side and defining a first and a second track pin bore communicating between the inboard and outboard sides. Each of the elongate links further include a flat lower surface in contact with one of the plurality of track shoes, and an upper rail surface in contact with the rotatable track engaging element. The upper rail surface is formed of a sacrificial wear material and has a convex longitudinal profile configured to delay scallop formation in the upper rail surface resulting from the contact with the rotatable track-engaging element.

In another aspect, a link for a track chain in a ground-engaging track system for a machine includes an elongate link body having an inboard side and an outboard side, and defining a first track pin bore formed in a first link body end and a second track pin bore formed in a second link body end. Each of the first and second bores communicate between the inboard and outboard sides and are configured to received a track pin therein for coupling the elongate length body with another elongate link body in the track chain. The elongate link body further includes a flat lower surface configured to contact a track shoe bolted to the elongate link body, and an upper rail surface configured to contact a rotatable track-engaging element in the track system. The upper rail surface is formed of a sacrificial wear material and has a convex longitudinal profile configured to delay scallop formation in the upper rail surface resulting from the contact with the rotatable track-engaging element.

In still another aspect, a method of operating a ground-engaging track system for a machine includes advancing a track of the ground-engaging track system about a plurality of rotatable track-engaging elements. The method further includes moving links in first and second track chains of the track into engagement with one of the rotatable track-engaging elements via the advancement, such that upper rail surfaces of the links each having a convex longitudinal profile contact the one of the rotatable track-engaging elements. The method still further includes wearing away a sacrificial wear material of the links forming the upper rail surfaces in a non-scalloping wear pattern.

DETAILED DESCRIPTION

Figure 1:
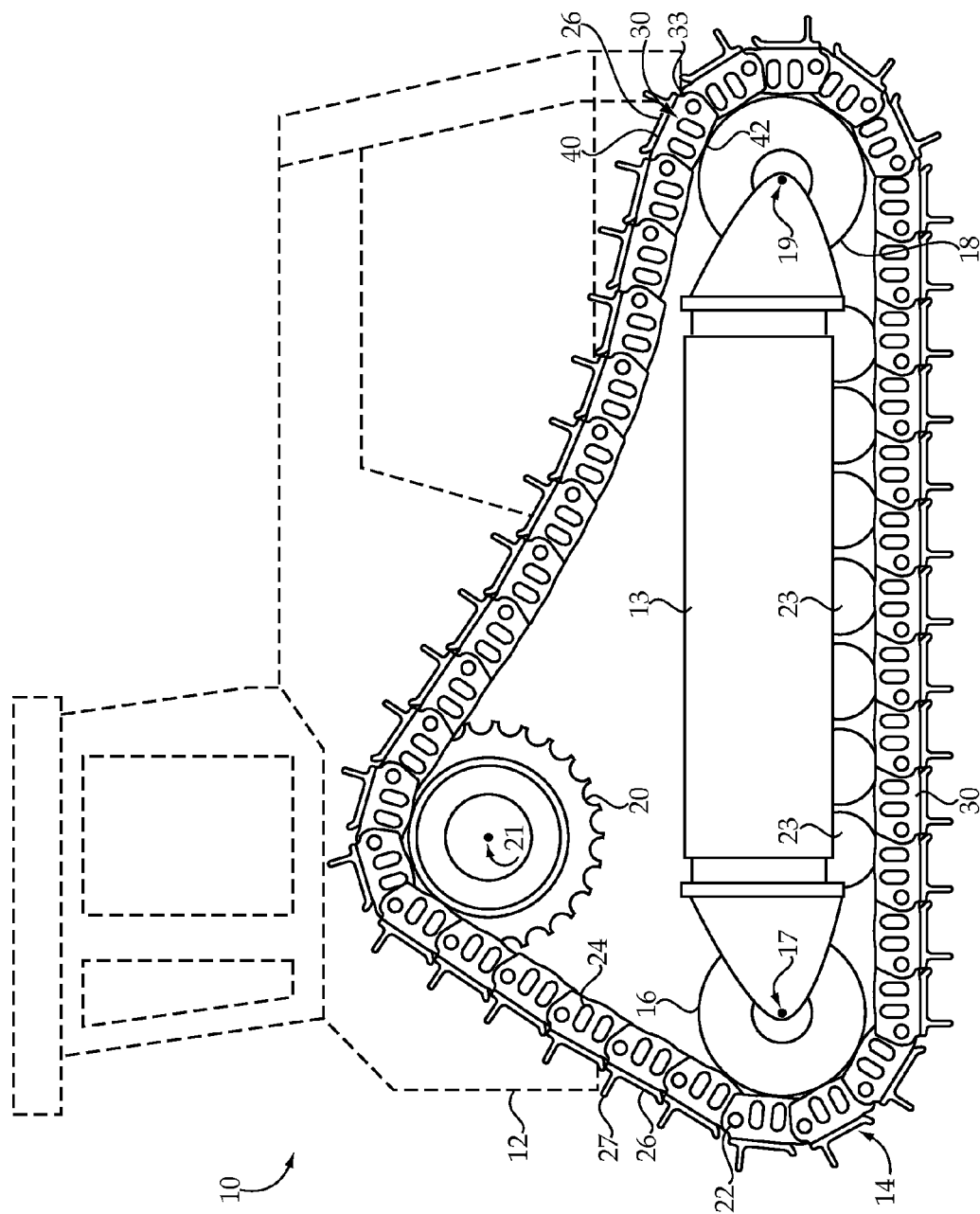
FIG. 1 is a side diagrammatic view of a machine having a ground-engaging track system, according to one embodiment.

Referring to FIG. 1, there is shown a machine 10 including a ground-engaging track system 14 according to one embodiment. Machine 10 is shown in the context of a track-type tractor, but could be any of a variety of other machines such as a tracked loader, a half-track machine, or still others. Track system 14 may be one of two separate track systems positioned at opposite sides of a frame 12 of machine 10 in a conventional manner. Track system 14 may further include a track roller frame 13 coupled with machine frame 12, and a plurality of rotatable track-engaging elements 16, 18, and 20. In one embodiment, rotatable track engaging elements 16 and 18 include rotatable idlers configured to rotate passively during operation of track system 14, whereas element 20 includes a sprocket configured to drive track system 14. Track system 14 may further include a plurality of track rollers 23 configured to bear all or substantially all of a weight of machine 10, also mounted to track roller frame 13.

Track system 14 further includes a track 22 extending about each of rotatable track-engaging elements 16, 18 and 20 and track rollers 23. Elements 16, 18 and 20 each define an axis of rotation 17, 19 and 21, respectively, which axes may be parallel and arranged in a triangular pattern as shown. Track 22 may thus define a travel path about elements 16, 18 and 20 having a generally triangular shape. The embodiment shown in FIG. 1 will be understood by those skilled in the art as a "high-drive" track system, however, it should be appreciated that the present disclosure is not thereby limited. As will be further apparent from the following description, track system 14 may be uniquely configured to address certain wear issues associated with known track systems, and thereby increase track service life over what is conventionally attainable.

Track 22 may include a first track chain 24, a second track chain which is hidden from view by track chain 24 in FIG. 1, and a plurality of tracks shoes 26 coupled with first track chain 24 and the second, hidden track chain. Each of track shoes 26 may include one or more grousers 27 in a conventional manner. Each of the first and second track chains may also include a plurality of elongate links 30, each including a link body 33. Each link body 33 may include a flat lower surface 40 in contact with one of track shoes 26, and an upper rail surface 42 presently in contact with one of elements 16 and 18, or configured to contact one of those elements via advancing of track 22 during operation, as the case may be. Upper rail surface 42 may be formed of a sacrificial wear material, as further described herein, and has a convex longitudinal profile configured to delay scallop formation in upper rail surface 42 resulting from the contact with rotatable track engaging elements 16 and 18, and potentially track rollers 23. Those skilled in the art will appreciate that the upper rail surfaces 42 of each of links 30 together form rails in the two track chains upon which idlers 16 and 18 and track rollers 23 ride. Drive sprocket 20, in contrast, may contact track 22 between links 30 rather than upon the rails.

Figure 2:
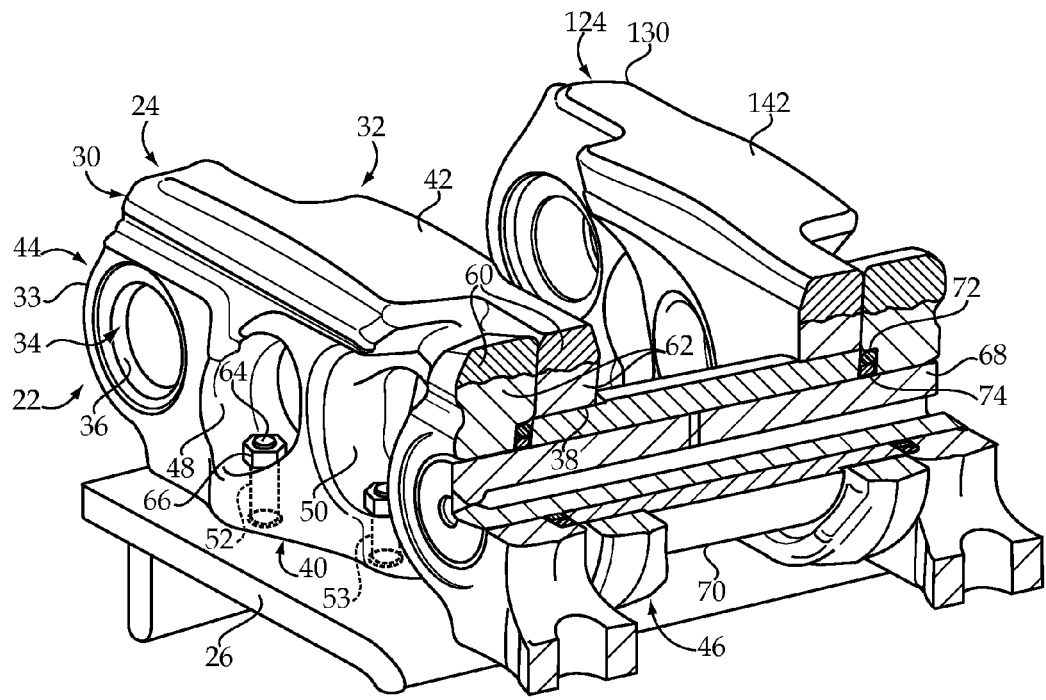
FIG. 2 is a partially sectioned diagrammatic view, in two section planes, of a portion of the track system shown in FIG. 1.
Figure 3:
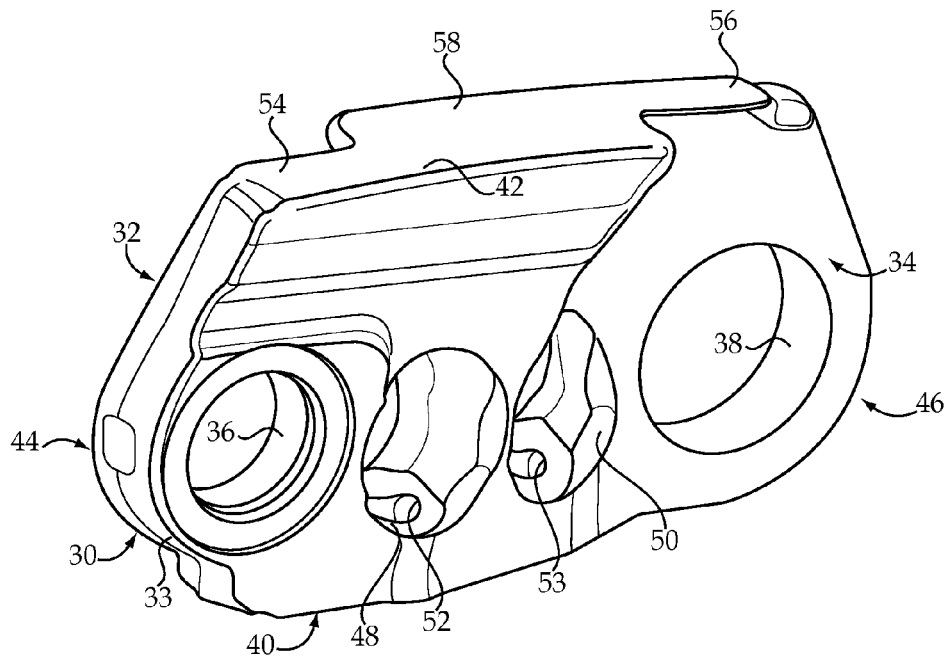
FIG. 3 is a isometric view of a link for a track chain, according to one embodiment.

Referring now also to FIGS. 2 and 3, first track chain 24 may be coupled with the second track chain 124 via a plurality of track pins, one of which is shown and identified via reference numeral 68 in FIG. 2. A plurality of bushings 70, which may be rotatable or fixed, may be positioned upon the plurality of track pins. Track 22 may further be equipped with a plurality of track seals 72 associated with each set of bushings and track pins, and a plurality of thrust rings 74. It may be noted from FIG. 2 that link 30, and a counterpart link 130 in track chain 124, are mirror images of one another. Accordingly, the present description should be understood to refer to any of the links in either of track chains 24 or 124, with consideration to the mirror image relationship. Each of the links within each track chain may be identical, but for a master link in certain embodiments.

As also shown in FIGS. 2 and 3, link body 33 may include an inboard side 32 and an outboard side 34. Link body 33 further defines a first track pin bore formed in a first link body end 44, and a second track pin bore 38 formed in a second link body end 46. Each of track pin bores 36 and 38 communicate between inboard side 32 and outboard side 34. In a practical implementation strategy, first track pin bore 36 may have an interference fit with one of the track pins, whereas second track pin bore 38 may have an interference fit with one of the bushings. As noted above, upper rail surface 42, and in the case of track chain 124 an upper rail surface 142, may be formed of a sacrificial wear material. In a practical implementation strategy, the sacrificial wear material includes a hardened material 60 such as might be formed via induction hardening or another hardening process. Each link 30 and 130 may further include an unhardened material 62, and first and second track pin bores 36 and 38 may be defined by unhardened material 62 so as to avoid difficulties in forming the interference fits mentioned above. The present disclosure is nevertheless not limited to any particular materials, material hardnesses, or for that matter track assembly strategy. For instance, rather than utilizing interference fits in whole or in part, pin retention strategies of another sort might be used to couple ends of the track pins to track links. As noted above, the bushings might freely rotate upon the track pins.

It is contemplated that a variety of track link designs fall within the context of the present disclosure. In one practical implementation strategy, links 30 and 130 may be S-shaped, although in other embodiments they might be straight. Those skilled in the art will be familiar with the difference between S-shaped and straight links. In S-shaped links as shown, bores 36 and 38 are laterally offset from one another, in other words not aligned in an inboard to outboard direction. Upper rail surface 42 also has a geometry generally S-shaped, when viewed from above, and such that a center section 58 of upper rail surface 42 extends between a first end section 54 and a second end section 56 laterally offset from first end section 54. Link 30 further defines a first window 48 and a second window 50 communicating between inboard side 32 and outboard side 34. A first bolting bore 52 and a second bolting bore 53 extend inwardly from lower surface 40 and intersect first and second windows 48 and 50, respectively. Track system 14 further comprises bolts 64 which are received within bolting bores 52 and 53 in link 30, and attach one of track shoes 50 to the corresponding link 30. Nuts 66 may be positioned within windows 48 and 50 and engaged with bolts 66.

Figure 4:
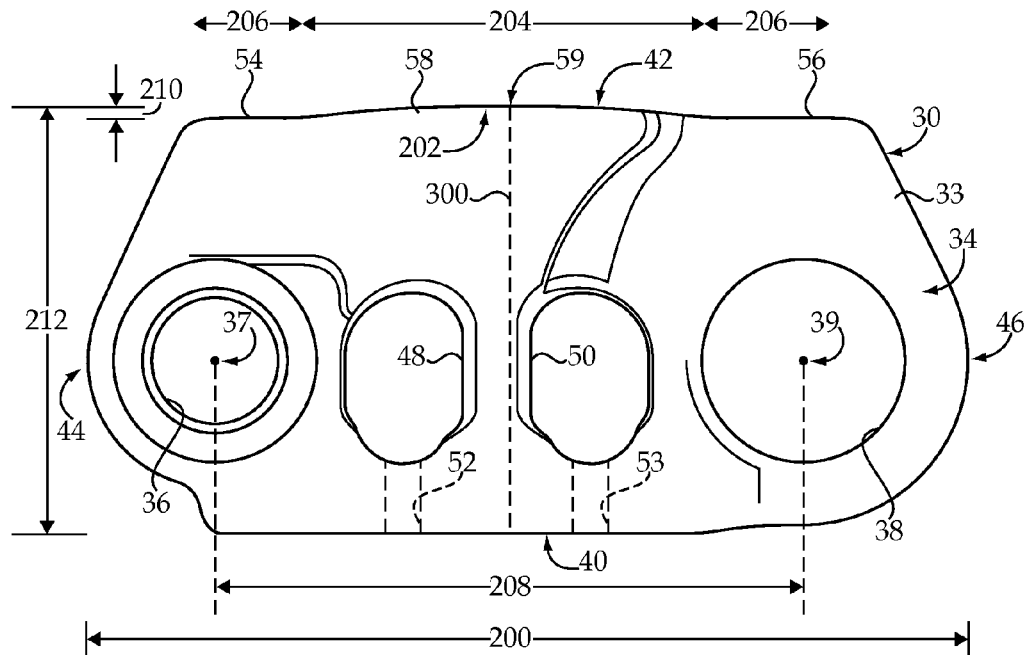
FIG. 4 is a side diagrammatic view of the link of FIG. 3.

Referring now also to FIG. 4, there is shown a side view of link 30 identifying additional geometric attributes. As noted above, upper rail surface 42 may be shaped such that it has a center section 58 and a first and second end section 54 and 56. The convex longitudinal profile of upper rail surface 42 extending between first and second link body ends 44 and 46 is readily apparent in FIG. 4. In the illustrated embodiment, the convex longitudinal profile is formed by center section 58, and each of first end section 54 and second end section 56 is flat and forms a linear longitudinal profile smoothly transitioning with the convex longitudinal profile formed by center section 58. First and second end sections 54 and 56 may be positioned in a common plane, and parallel to lower surface 40. The side view of link body 33 in FIG. 4 shows outboard side 34. Upper rail surface 42 may have a uniform profile extending laterally from outboard side 34 to inboard side 32. Accordingly, upper rail surface 42 may be understood to have a linear transverse profile in each of first and second end sections 54 and 56 and center section 58. In a section view taken perpendicular to a plane of the page in FIG. 4, and extending vertically between lower surface 40 and upper rail surface 42, a profile of upper rail surface 42 may thus be a straight line.

Also shown in FIG. 4 is a body length 200 of link body 33, and each of a center section length 204 and a first and second end section length 206. In a practical implementation strategy, center section length 204 may be greater than a sum of end section lengths 206, which may be equal. Center section 58 may further define a uniform radius of curvature 202 greater than body length 200. The uniform radius of curvature may be from about 500 millimeters to about 1000 millimeters. More particularly, the uniform radius of curvature of 202 may from about 800 millimeters to about 900 millimeters, and more particularly still may be equal to about 857 millimeters. As used herein, the term "about" should be understood in the context of conventional rounding to a consistent number of significant digits. Accordingly, "about" 500 millimeters means from 450 millimeters to 549 millimeters, "about" 857 millimeters means from 856.5 millimeters to 857.4 millimeters, and so on.

Center section 58 may further include a peak 59 coincident with a longitudinal centerline 300 of link body 33. As noted above, first and second end sections 54 and 56 may be positioned in a common plane. An elevation (shown as 210) of peak 59 relative to first and second end sections 54 and 56, and to the common plane, may be from about 4 millimeters to about 12 millimeters, and more particularly may be about 5 millimeters. A vertical distance 212 between lower surface 40 and peak 59 may be from about 60 millimeters to about 240 millimeters, and more particularly may be about 190 millimeters. Also illustrated in FIG. 4 are a longitudinal axis 39 defined by track pin bore 38 and a longitudinal axis 37 defined by track pin bore 36. Axes 37 and 39 may be parallel, and in one embodiment a distance 208 between axes 37 and 39 may be from about 100 millimeters to about 300 millimeters.

Industrial Applicability

Figure 5:
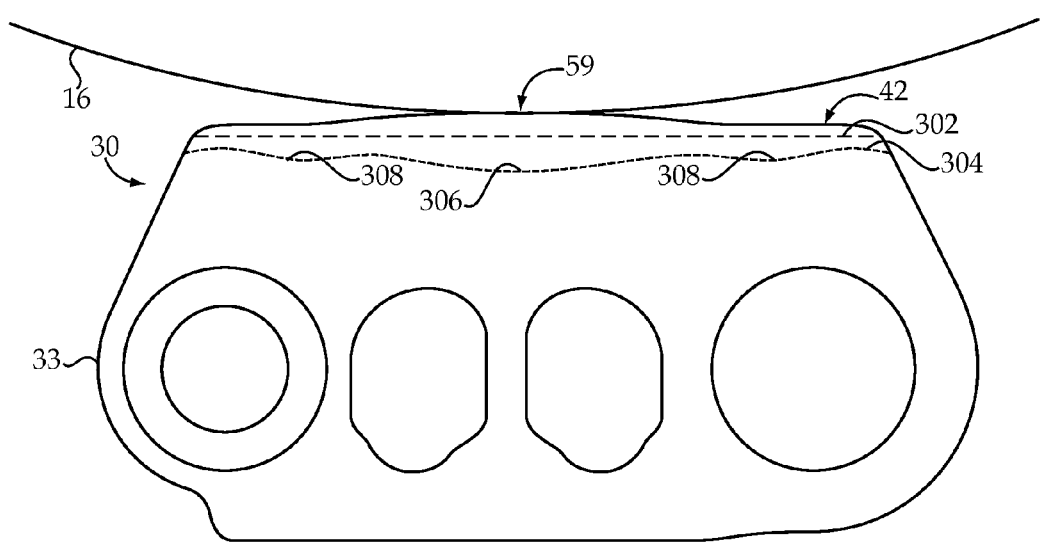
FIG. 5 is a side diagrammatic view of the link of FIGS. 3 and 4 shown contacting a rotatable track-engaging element.

Referring to the drawings generally, but now in particular to FIG. 5, there is shown link 30 as it might appear where link body 33 is in contact with rotatable track engaging element 16. Peak 59 is shown contacting element 16, as it might appear where the portion of track 22 including the illustrated link is wrapped about element 16. During advancing track 22 about element 16, links in first and second track chains 24 and 124 will be moved into engagement with element 16, and then moved out of engagement as advancement of the track progresses. Track 22 will tend to transition from a straight configuration approaching element 16 to a curved configuration as it wraps about element 16, and then back to a straight configuration as the track moves about its path. Engagement and disengagement with element 18 may take place generally analogously. As a portion of track 22 transitions between a curved configuration and a straight configuration, upper rail surfaces 42 of adjacent links may become slightly closer together or further apart as the case may be, and thus slide against the outer surface of the track-engaging elements when moving into or out of the curve. This phenomena has been observed to cause wearing away of material from the upper rail surfaces which eventually results in a scalloped pattern. The scalloped pattern of wear can result in vibration and bumps as the machine travels across a substrate. In other words, the scalloped surfaces of the link once severe enough can cause the ride to be rough, ultimately making operation uncomfortable for the operator and potentially even affecting a service life of other components of the machine. For these reasons, scalloping of track links is often the limiting factor in track service life.

It has been discovered that forming upper rail surface 42 with a convex longitudinal profile as described herein can delay formation of scallops and thereby prolong track service life. In FIG. 5, a worn profile 302 is shown which illustrates approximately how the longitudinal profile of upper rail surface 42 might appear after experiencing some wear, whereas another worn profile 304 illustrates a center scallop 306 and outer scallops 308 which might be observed in upper rail surface 42 after experiencing more substantial wear such that a track link 30 is nearing the end of its service life. In other words, track link 30 can be expected to wear in a pattern such that the convex longitudinal profile of upper rail surface 42 is diminished to become substantially linear, as shown approximately via profile 302, and later through further wear become scalloped, as shown approximately via profile 304. It is nevertheless contemplated that the time required for upper rail surface 42 to reach a scalloped state may be as much as twice as long, or even greater, as was formerly the case with conventional straight, flat rail surfaces. In the FIG. 5 illustration, center scallop 306 may be expected to form in response to contact with idlers such as element 16, whereas outer scallops 308 may be expected to at least sometimes form from contact with track rollers. Embodiments are contemplated which have a compound convex profile with multiple rises or bumps in the upper rail surface generally configured as a mirror image of profile 304. In either of these general strategies, the extra wear material placed to delay scalloping enables wear to proceed at least initially in a non-scalloping wear pattern.

As discussed above, a scalloped profile of an upper rail surface in a track link can be expected to affect the smoothness of the ride in the machine. In an analogous manner, a convex longitudinal profile which is too sharply radiused, or elevated too high from ends of the corresponding link body, could also be expected to negatively impact ride, at least until some weaning away of material has occurred. While the present disclosure is not limited with regard to any particular elevation of a peak on a convex profiled upper rail surface, or with respect to any particular dimensions or other geometric link attributes, it has been discovered that the dimensional ranges and proportions disclosed herein can be expected to provide both an acceptably smooth ride when installed for initial service, and an extended track service life. Accordingly, the dimensions and proportions set forth and discussed in connection with FIG. 4 may be understood as practical implementation strategies which balance ride smoothness with increased track service life.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A ground-engaging track system for a machine comprising:
   a rotatable track-engaging element;
   a track extending about the rotatable track-engaging element and including a first and a second track chain and a plurality of track shoes coupled with the first and second track chains;
   the first and second track chains each including a plurality of elongate links each having an inboard side and an outboard side and defining a first and a second track pin bore communicating between the inboard and outboard sides; and
   each of the plurality of elongate links further including a flat lower surface in contact with one of the plurality of track shoes, and an upper rail surface in contact with the rotatable track engaging element, the upper rail surface being formed of a sacrificial wear material and having a convex longitudinal profile configured to delay scallop formation in the upper rail surface resulting from the contact with the rotatable track engaging element, wherein each of the plurality of elongated links is S-shaped, such that the upper rail surface includes a center section extending between a first end section and a second end section that is laterally offset from the first end section, and wherein the convex longitudinal profile is formed by the center section, and each of the first and second end sections is flat and forms a linear longitudinal profile transitioning with the convex longitudinal profile.

2. The track system of claim 1, wherein the sacrificial wear material includes a hardened material, and wherein each of the plurality of elongated links further includes an unhardened material and the first and second tracking pin bores are defined by the unhardened material.

3. The track system of claim 1, wherein each of the plurality of elongated links further defines a first and a second window communicating between the inboard and outboard sides, and a first and a second bolting bore extending inwardly from the flat lower surface and intersecting the first and second windows, respectively, and further comprising bolts received within the bolting bores in each of the plurality of elongated links and attaching one of the plurality of track shoes to the corresponding elongated link.

4. The track system of claim 1, wherein the upper rail surface has a linear transverse profile in each of the first and second end sections and the center section.

5. The track system of claim 1, wherein the rotatable track-engaging element includes a first idler, and a second idler, a drive sprocket, and a plurality of track rollers, and wherein the track defines a travel path extending about the first and second idlers, the drive sprocket, and the plurality of track rollers, and wherein the first and second idlers and the drive sprocket have parallel axes of rotation arranged in a triangular pattern.

6. The track system of claim 5, wherein the plurality of elongated links in the first track chain are mirror images of the plurality of elongated links in the second track chain, and further comprising a plurality of track pins coupling together the first and second track chains, and a plurality of bushings positioned upon the plurality of track pins.

7. The track system of claim 5 wherein each of the first and second track pin bores defines a longitudinal axis, and a distance between the longitudinal axes is from about 100 mm to about 300 mm, wherein the center section of each of the upper rail surfaces includes a peak having an elevation relative to the corresponding first and second end sections from about 4 mm to about 12 mm, and wherein a vertical distance between the lower surface and the peak is from about 60 mm to about 240 mm.

8. A link for a track chain in a ground-engaging track system for a machine comprising:
an elongate link body including an inboard side and an outboard side, and defining a first track pin bore formed in a first link body end and a second track pin bore formed in a second link body end, each of the first and second track pin bores communicating between the inboard and outboard sides and being configured to receive a track pin therein for coupling the elongate link body with another elongate link body in the track chain;
the elongate link body further including a flat lower surface configured to contact a track shoe bolted to the elongate link body, and an upper rail surface configured to contact a rotatable track-engaging element in the track system; and
the upper rail surface being formed of a sacrificial wear material and having a convex longitudinal profile configured to delay scallop formation in the upper rail surface resulting from the contact with the rotatable track engaging element, wherein the elongated link body further defines a first and a second window each communicating between the inboard and outboard sides, and a first and a second bolting bore each extending inwardly from the lower surface and intersecting the first and second windows, respectively, wherein the upper rail surface further includes a first end section, a second end section, and a center section that forms the convex longitudinal profile and extending between the first and second end sections, and wherein the first and second end sections are flat, positioned in a common plane, and parallel to the lower surface.

9. The link of claim 8, wherein the elongate link body is S-shaped such that the first and second end sections are laterally offset from one another, and wherein the upper rail surface has a linear transverse profile within the first and second end sections and the center section.

10. The link of claim 9, wherein the elongated link body has a body length, and the center section defines a uniform radius of curvature greater than the body length.

11. The link of claim 10 wherein the uniform radius of curvature is from about 500 mm to about 1000 mm.

12. The link of claim 10, wherein the center section has a center section length and the first and second end sections have equal end section lengths, and the center section length being greater than a sum of the end section lengths, and the center section including a peak coincident with a longitudinal vertical centerline of the elongated link body.

13. The link of claim 9 wherein each of the first and second track pin bores defines a longitudinal axis, and a distance between the longitudinal axes is from about 100 mm to about 300 mm, wherein the center section of each of the upper rail surfaces includes a peak having an elevation relative to the corresponding first and second end sections from about 4 mm to about 12 mm, and wherein a vertical distance between the lower surface and the peak is from about 60 mm to about 240 mm.

14. The link of claim 13 wherein the elevation is about 5 mm, and the distance between the lower surface and the peak is about 190 mm.

15. A method of operating a ground-engaging track system for a machine comprising the steps of:
advancing a track of the ground-engaging track system about a plurality of rotatable track-engaging elements;
moving links in first and second track chains of the track into engagement with one of the plurality of rotatable track-engaging elements via the advancement, such that upper rail surfaces of the links each having a convex longitudinal profile in contact with the one of the plurality of rotatable track-engagement elements, wherein each of the links is S-shaped, such that each of the upper rail surface includes a center section extending between a first end section and a second end section that is laterally offset from the first end section, and wherein the convex longitudinal profile is formed by the center section, and each of the first and second end sections is flat and forms a linear longitudinal profile transitioning with the convex longitudinal profile; and
wearing away a sacrificial wear material of the links formed in the upper rail surfaces in a non-scalloping wear pattern.

16. A track chain comprising:
a plurality of elongate links each having an inboard side and an outboard side, wherein each of the plurality of elongate links further including a flat lower surface in contact with one of a plurality of track shoes, and an upper rail surface configured to contact a plurality of rotatable track engaging elements on a machine,
wherein the upper rail surface being formed of a sacrificial wear material and having a convex longitudinal profile formed in a center portion, the center portion extending between a first end section and a second end section, and wherein each of the first and second end sections is flat and forms a linear longitudinal profile transitioning with the convex longitudinal profile.

17. A track chain comprising:
a plurality of elongate links each having an inboard side and an outboard side, wherein each of the plurality of elongate links further including a lower surface in contact with one of a plurality of track shoes, and an upper rail surface configured to contact a plurality of rotatable track engaging elements on a machine,
the upper rail surface being formed of a sacrificial wear material and having a convex longitudinal profile formed in a center portion, the center portion extending between a first end section and a second end section, and wherein each of the first and second end sections of the upper rail surface is substantially flat.

* * * * *